United States Patent
Naidu et al.

(10) Patent No.: US 7,770,185 B2
(45) Date of Patent: Aug. 3, 2010

(54) INTERCEPTOR METHOD AND SYSTEM FOR WEB SERVICES FOR REMOTE PORTLETS

(75) Inventors: Purushotham Babu Naidu, Lafayette, CO (US); Subrahmanyam Allamaraju, Longmont, CO (US)

(73) Assignee: BEA Systems, Inc., Redwood Shores, CA (US)

(*) Notice: Subject to any disclaimer, the term of this patent is extended or adjusted under 35 U.S.C. 154(b) by 1057 days.

(21) Appl. No.: 11/416,737

(22) Filed: May 2, 2006

(65) Prior Publication Data

US 2007/0074227 A1 Mar. 29, 2007

Related U.S. Application Data

(60) Provisional application No. 60/720,946, filed on Sep. 26, 2005.

(51) Int. Cl.
*G06F 3/00* (2006.01)
*G06F 15/76* (2006.01)

(52) U.S. Cl. .......... 719/320; 719/330; 719/313; 712/29

(58) Field of Classification Search .......... 709/203; 705/7
See application file for complete search history.

(56) References Cited

U.S. PATENT DOCUMENTS

2003/0219103 A1* 11/2003 Rao et al. ............. 379/32.05
2004/0064503 A1* 4/2004 Karakashian et al. ....... 709/203
2004/0167960 A1* 8/2004 Kinner et al. ............ 709/203
2005/0071209 A1* 3/2005 Tatavu et al. .............. 705/7
2006/0041641 A1* 2/2006 Breiter et al. ............ 709/219
2006/0123039 A1* 6/2006 Scheuerle et al. .......... 707/102

OTHER PUBLICATIONS

IBM, Introduction to Web Services for Remote Portlets, Apr. 15, 2005, IBM, pp. 1-9.*
Web Services for Remote Portlets (WSRP) Specification, Version 1.0, the Organization for the Advancement of Structured Information Standards (OASIS), Sep. 3, 2003 (accessed Apr. 28, 2006), http://www.oasis-open.org, 86 pages.
Allamaraju, Subbu, "Inside WSRP," BEA Systems Dev2Dev, Mar. 7, 2005, http://dev2dev.bea.com/pub/a/2005/03/inside_wsrp.html, 10 pages.

* cited by examiner

*Primary Examiner*—Hyung S Sough
*Assistant Examiner*—Tuan Dao
(74) *Attorney, Agent, or Firm*—Fliesler Meyer LLP (57) ABSTRACT

In accordance with embodiments, there are provided mechanisms and methods for providing interceptors between producer(s) and consumer(s) of content in a remote portal system. These mechanisms and methods for providing interceptors between producer(s) and consumer(s) of content can enable embodiments to provide improved functionality and/or flexibility to systems comprising remote portals. The ability of embodiments to provide improved functionality and/or flexibility can enable end users, systems programmers and so forth to obtain greater value from remote portal installations.

17 Claims, 7 Drawing Sheets

INTERCEPTOR METHOD AND SYSTEM FOR WEB SERVICES FOR REMOTE PORTLETS

CLAIM OF PRIORITY

The present application claims the benefit of U.S. Provisional Patent Application No. 60/720,946, entitled WSRP INTERCEPTOR FRAMEWORK, by Subrahmanyam Allamaraju et al., filed Sep. 26, 2005, which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

INCORPORATION BY REFERENCE

The Web Services for Remote Portlets (WSRP) standard version 1.0, by the OASIS Group, available at http://www.oasis-open.org (last access Apr. 28, 2006), is incorporated herein by reference in its entirety.

FIELD OF THE INVENTION

The present invention relates generally to the delivery of web portal content, and more specifically to interceptor methods and systems for web services for remote portlets.

BACKGROUND OF THE INVENTION

Recently, web portals, which provide access to a variety of applications and content through a single location, have become increasingly popular. One ongoing need has been the ability for providers of web applications to utilize a wide range of applications without having to set up an elaborate support framework for the applications.

The Web Services for Remote Portlets (WSRP) standard by the OASIS group has enabled the delivery of functional applications from producer sites to consumer sites. However, the implementation of WSRP has presented considerable opportunities for further enhancement, extension of functionality and improvement.

DETAILED DESCRIPTION

The invention is illustrated by way of example and not by way of limitation in the figures of the accompanying drawings in which like references indicate similar elements. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to those skilled in the art that the invention may be practiced without these specific details. In other instances, well-known features have not been described in detail so as not to obscure the invention.

Although a diagram may depict components as logically separate, such depiction is merely for illustrative purposes. It can be apparent to those skilled in the art that the components portrayed can be combined or divided into separate software, firmware and/or hardware components. For example, one or more of the embodiments described herein can be implemented in a network accessible device/appliance such as a router. Furthermore, it can also be apparent to those skilled in the art that such components, regardless of how they are combined or divided, can execute on the same computing device or can be distributed among different computing devices connected by one or more networks or other suitable communication means.

In accordance with embodiments, there are provided mechanisms and methods for providing interceptors between producer(s) and consumer(s) of content in a remote portal system. These mechanisms and methods can provide an interceptor framework, which is a consumer-oriented framework that enables users to intercept and modify markup and user interaction-related remote portal messages sent to and received from producers. This framework exposes a set of interfaces for the user to implement. These interfaces can enable users to examine the content of a remote portal message and take specific action based on that content. For example, if a producer sends a registration error back to the consumer, an interceptor can detect that error and display an informative message to the user or, perhaps, automatically return the information required to complete the registration. The ability of embodiments to provide improved functionality and/or flexibility via an interceptor framework can enable end users, systems programmers and so forth to obtain greater value from remote portal installations.

In an embodiment and by way of example, a method for providing interceptors between producer(s) and consumer(s) of content is provided. The method embodiment includes receiving a definition of at least one public interceptor interface. The at least one public interceptor interface implements at least one feature or function of interest to a user. An occurrence of a condition associated with the at least one public interface is detected. Information flow between the producer and the consumer can be controlled by executing program code corresponding to the at least one feature or function of interest to the user responsive to detecting the occurrence of the condition associated with the at least one public interface.

As used herein, the term web services system refers to methods and mechanisms that enable web servers to serve pages that utilize remote portlets. As used herein, the term consumer system refers to methods and mechanisms that serve pages that utilize remote portlets stored on one or more producer systems.

While the present invention is described with reference to an embodiment in which techniques for communications between producer(s) and consumer(s) of content are implemented using executable programs written in the Java™ programming language, the present invention is not limited to the Java™ programming language. (Java™ is a trademark of Sun Microsystems, Inc.) Embodiments may be practiced using other interconnectivity specifications or programming languages, i.e., JSP and the like without departing from the scope of the embodiments claimed.

Figure 1:
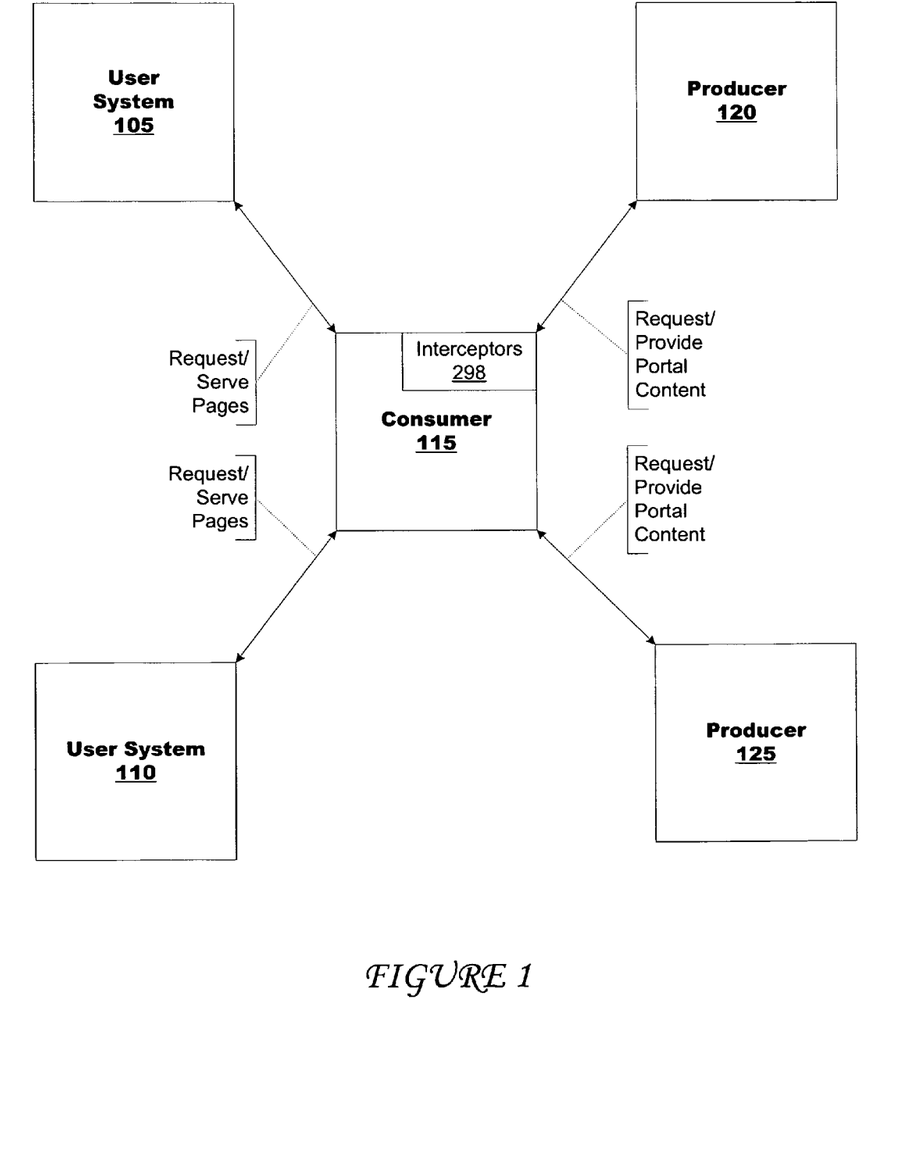
FIG. 1 is a block diagram illustrating an overview of interactions between a consumer system, user system(s), and producer system(s) in an embodiment.

FIG. 1 illustrates an overview of the interaction between a consumer system, user systems, and producer systems in an embodiment. Producer systems 120, 125 can store one or more portlet applications that are utilized by user systems 105, 110 through a consumer system 115. In some embodiments, the producer systems can maintain web portals. In alternate embodiments, the producer systems perform other functions or merely serve to provide access to portlets. The user systems 105, 110 are systems remote to the consumer 115 that are utilized by end users and include web page viewing capabilities.

The consumer 115 is a network accessible system that serves web pages, content, and applications to other parties. The consumer 115 can serve its own content in addition to content stored on the producers 120, 125. The consumer 115 presents a web interface to the user systems that utilizes applications stored both locally and on the producers 120, 125. The consumer serves pages that utilize remote portlets on the producers through proxy portlets and allow the consumer to utilize the remote portlets' functionality. The proxy portlets are references to remote portlets that are stored within the web pages on the consumer that cause the portlets to appear within the consumer web pages.

Consumer 115 implements an interceptor framework including interceptors 298. Interceptors 298 intercept and allow processing of incoming and outgoing WSRP messages passed between the consumer 115 and one or more producers 120, 125. Interceptors may be associated with specific consumer web applications (web application scoped). Users can chain together several interceptors to accommodate more complex use cases, as will be described in further detail below with reference to FIG. 4D.

During a registration phase, the consumer 115 registers with a producer 120. In one embodiment, the producer 120 identifies each consumer with a unique handle that enables the producer 120 to identify what portlets are available to a particular consumer. The interceptor framework 298 defines a plurality of public interceptor interfaces. To work with interceptors, users implement one or more of these interfaces and register the implementation classes in a configuration file called wsrp-consumer-handler-config.xml. This configuration file is web application-scoped, and resides in the consumer 115 web application's WEB-INF directory in an embodiment (not shown in FIG. 1 for brevity).

In some embodiments, the consumer does not register with the producer 120. The producer can provide a service description to the consumer 115 that indicates properties of the producer 120 and lists the available portlets that are stored on the producer 120. During a description phase, the producer 115 also provides a Web Services Description Language (WSDL) file indicating data types and message protocols to be used for interacting with the producer 120. This process is described in greater detail with respect to FIG. 2.

When a user system 105 establishes contact with the consumer 115, the consumer aggregates pages, and stores proxy portlets in the pages that access remote portlets on the producer 120. The user system 105 can send a page request to the consumer 115 for a page that includes remote portlets that utilize the producer. When the consumer 115 receives such a request from the user system 105, the consumer 115 sends a request for the data that appears in the page to the producer 120. The producer 120 returns the data, which the consumer integrates into a single user interface and presents to the end user system 105.

Figure 2:
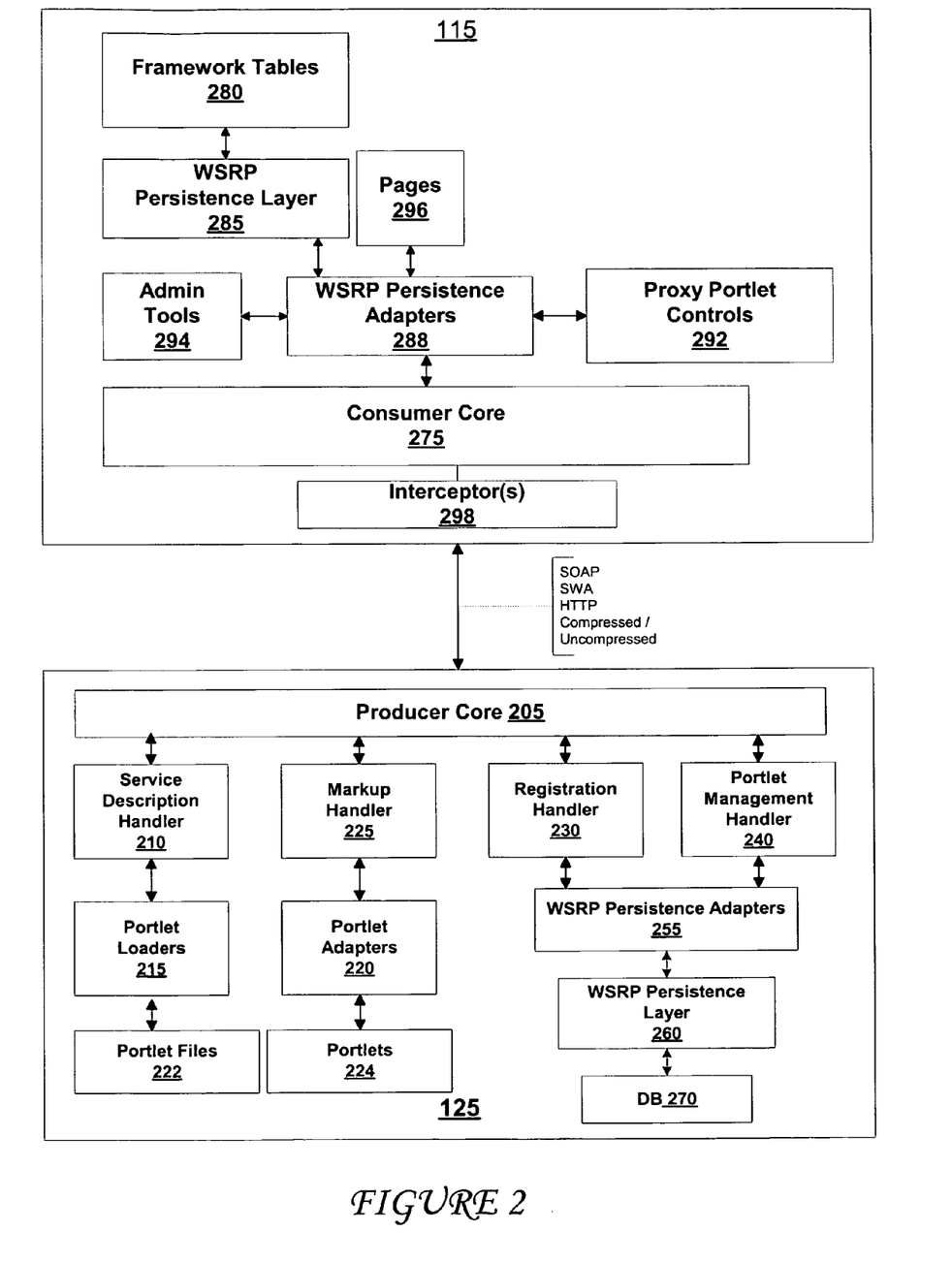
FIG. 2 is a block diagram illustrating an overview of providing interceptors between producer(s) and consumer(s) of content in an embodiment.

FIG. 2 is a block diagram illustrating a more detailed view of a consumer 115 and a producer 125 in an embodiment. The producer 125 includes a producer core 205, a service description handler 210, portlet loaders 215, portlet adapters 220, portlet files 222, a markup handler 225, a registration handler 230, a portlet management handler 240, WSRP persistence adapters 255, persistence layers 265, one or more portlets 224, a server module 242, and a database (DB) 270.

The producer core 205 is an application such as a servlet that is configured to reside on the producer and communicates with the consumer 115. The producer core 205 generates the WSDL files that indicate the parameters of communication between the producer 125 and the consumer 115 and transmits a file to the consumer 115 or otherwise provides the parameters to the consumer. These parameters can include data types and messaging protocols and can be preconfigured or user-selected.

Interceptors 298 intercept and allow processing of incoming and outgoing WSRP messages passed between the consumer 115 and one or more producers 125. Interceptors 298 are associated with specific consumer web applications (web application scoped). Further, in an embodiment, interceptors may be chained together to accommodate more complex use cases.

The producer 125 additionally includes a service description handler 210. The service description handler 210 is responsible for providing a listing of portlets 224 that are available to consumers. The service description handler utilizes the portlet loaders 215 to load the portlet files 222. The portlet files 222, which define the available portlets, are either portlet files or files created from a deployment descriptor such as a portlet.xml file. In some embodiments, the portlet loaders 215 include separate loaders for different types of portlets such as without limitation Java Page Flow (JPF) portlets, Struts portlets, Java Specification Request (JSR) 168 base portlets, Java portlets and other types of portlets known to those of ordinary skill in the art. While the above portlets types are used as examples throughout this application, it should be understood that any portlet type is supported.

The service description handler 210, through the producer core returns to the consumer 115 a list of available portlets in the form of an array of PortletDefinition classes or some other format. The PortletDefinition classes include a portletHandle identifier that identifies the portlet and modes, states, MIME types, a title, and a description for each portlet. Other information can also be provided.

A registration handler 270 registers consumers with the producer 125 so that the consumers can access portlets on the producer 125. The registration process entails the consumer 115 providing certain predetermined identification information to the producer 125. In some embodiments, the producer does not register the consumer. The consumer registration information can be stored in the database 270 through the persistence adapters 255 and persistence layer 265.

The portlet management handler 240 is responsible for storing, modifying, and retrieving portlet preferences and modifying or deleting portlets. The WSRP persistence adapters 255 are configured to receive requests to generate, modify, and read information stored in the database 270 from the registration handler 230 and portlet management handler 240. In one embodiment, the WSRP persistence adapters 255 include separate adapters for the registration handler 230 and the portlet management handler 240. The persistence layer 260 manages access to the database by representing data in the database as objects, and allows particular data types to be accessed as such without requiring that the accessing entity have any knowledge about how said data is stored in the database. When a request to modify data, such as modifying the registration information of a consumer is received from the registration handler 230 through its persistence adapter 255, the persistence layer 265 receives the request in the form of an object modification request. The persistence layer 265 locates the various instances in the database associated with the registration information and modifies them appropriately.

The markup handler 225 is responsible for processing markup requests for the portlets 224 (requests for the visual representation of the portlets within the page). When a request from a user system is received at the consumer, for example, a page is loaded that utilizes a remote portlet, the consumer 115 requests the appropriate render data from the producer. This request includes an identity of the portlet and a listing of capabilities of the user system. The markup handler 225 receives this request and determines an appropriate portlet adapter 220 to access the referenced portlet. The portlet adapters 220 are adapters that enable portlets 224 to be accessed as remote portlets. The portlet adapters can include portlet adapters for multiple portlet types, such as JPF, Java, JSR 168, and Struts portlets. In some embodiments, a portlet adapter can comprise a Java Archive (JAR) file that is inserted into a producer to enable it to interact with remote consumers in a manner similar to how the portlet would interact with a local portal.

A server module 242 generates a user interface layer that enables a user selecting a portlet on a displayed page on a producer portal to obtain configuration information for utilizing the portlet as a remote portlet. This information can be obtained by selecting the portlet with a mouse, dragging the portlet to an email window or web browser window, or through some other means such as a voice interface or touchscreen. In some embodiments, the server module 242 performs other portal display/management functions as well.

The consumer 115 includes a consumer core 275 that manages communication with the producer 125, one or more persistence adapters 288, administration tools 294, proxy portlet controls 292, a WSRP persistence layer 285, and one or more pages 296 that reference the remote portlets 224 through included proxy portlets, a server module 276, and framework tables 280.

The interceptors 298 comprise interceptor method embodiments that intercept Simple Object Access Protocol (SOAP) (or another suitable protocol) messages exchanged between the consumer core 275 and the producer core 205. Users may design interceptors to manipulate these messages, delete or replace content to the messages using context objects or take some other action based upon the message. The interceptors can parse the data within the messages and, in embodiments, translate the data from SOAP to a format preferred by the user, such as without limitation Java Beans. In some embodiments, the consumer and producer cores use a variant of SOAP, known as SOAP With Attachments (SWA) that enables binary files to be attached to SOAP messages. In some embodiments, the producer and consumer use HyperText Transport Protocol (HTTP) compression to reduce the size of transmitted data. The consumer core 275 receives a Web Service Description Language (WSDL) file from the producer 125 that it uses to configure its interaction with the producer 125. While in the present embodiment a file is used, in alternate embodiments, the configuration information can be provided in a different manner.

The framework tables 280 store information about the portlets available on the producer 125 and other portlets that is received from the service handler 210 of the producers. This information can include identifying information for the portlets, identifying information for the producer 125, capacities of the producer 125, and the types of functionality provided by the portlets. The framework table 280 also can include information about instances of proxy portlets stored on the consumer 115. When a portlet is first identified during registration/discovery a proxy portlet control 292 is created for the proxy that can be used to configure how the proxy is utilized on the consumer side.

A set of administration tools 294 enable a user or administrator of the consumer to create web pages 296 that access the remote portlets on the producer. The administrative tools insert a proxy portlet associated with a remote portlet on the producer into a created page 296 in a location that would normally refer to a portlet local to the consumer.

A server module 276 generates a user interface layer that enables a user selecting a section on one of the pages 296 to receive configuration information for utilizing a portlet on the producer 125 as a remote portlet. This information can be obtained by selecting a portlet 125 on the producer with a mouse and dragging the portlet to one of the pages 296 or through some other means such as a voice interface, touchscreen interface, or custom means. In some embodiments, the server module 276 performs other portal display/management functions as well.

A persistence layer 285 enables the admin tools and the proxy portlet controls 292 to store information about proxy portlet instances, including configuration information through their respective persistence adapters 288. This information can be retrieved, created, or modified by submitting actions to be performed on data objects to the persistence layer 285. The persistence layer receives the actions, locates the data corresponding to the objects on the framework tables 280 and retrieves and/or modifies the tables accordingly.

When a user system attempts to render a page 296 on the consumer that includes one of the remote portlets 224, the consumer transmits a GetMarkup request to the producer 125 to obtain the rendered content that should appear in the page. The request includes a handle for the portlet and capabilities of the client on the user system 105. The producer 125 utilizes one of the portlet adapters 220 to obtain the rendered content for the page from the portlet and returns the content to the consumer 115, which renders the page.

If a user system initiates an interaction with a page utilizing a remote portlet, for example by submitting a form, the consumer 115 sends to the producer the handle for the portlet, the form data storing the information stored on the form, query data indicating a requested response from the portlet, and any uploaded information. The producer 125 utilizes one of the portlet adapters 220 to submit this information to the portlet as if it had been submitted locally to the portlet. The portlet processes the request and changes its current mode/window state in response. The mode/window state indicates a state/mode for the window displaying the portlet, such as minimized, maximized, hidden, or normal.

The producer then returns to the consumer the new window state and a new navigational state for the portlet indicating a new page to be rendered on the main page on the consumer 115. When the consumer 115 subsequently requests markup, this new page, which presumably includes the response to the submitted form, is displayed inside the viewed portal page on the consumer.

In various embodiments, the producer system 125 utilizes templates for various types of Uniform Resource Locators (URLs). The templates include embedded fields for different types of information to be provided by the producer or consumer. When URLs are passed between the producer and the consumer, they may be rewritten by the consumer or producer to reflect differences in how the URLs would be accessed from either system. For example, URL designed to be utilized by the producer might not include the domain of the producer and would only include a location in a local file system. The consumer could rewrite such a URL with a global address that included the domain of the producer. Alternately, when the consumer submits a markup or other page request to the producer, it embeds blank fields into the URL for information such as markup state, window state, interaction state, and other information. The producer then rewrites the URL with this information included.

In some embodiments, page flow portlets and struts portlets can interact directly with a user system rather than working through the consumer. As mentioned above, the producer can utilize a URL writing framework based on templates. When portlets are interacting directly with a user, one set of templates is used. When portlets interact through a consumer a separate set of templates are used. For example, when a portlet is being accessed directly by a user, a template is used that does not require rewriting by the consumer.

Figure 3:
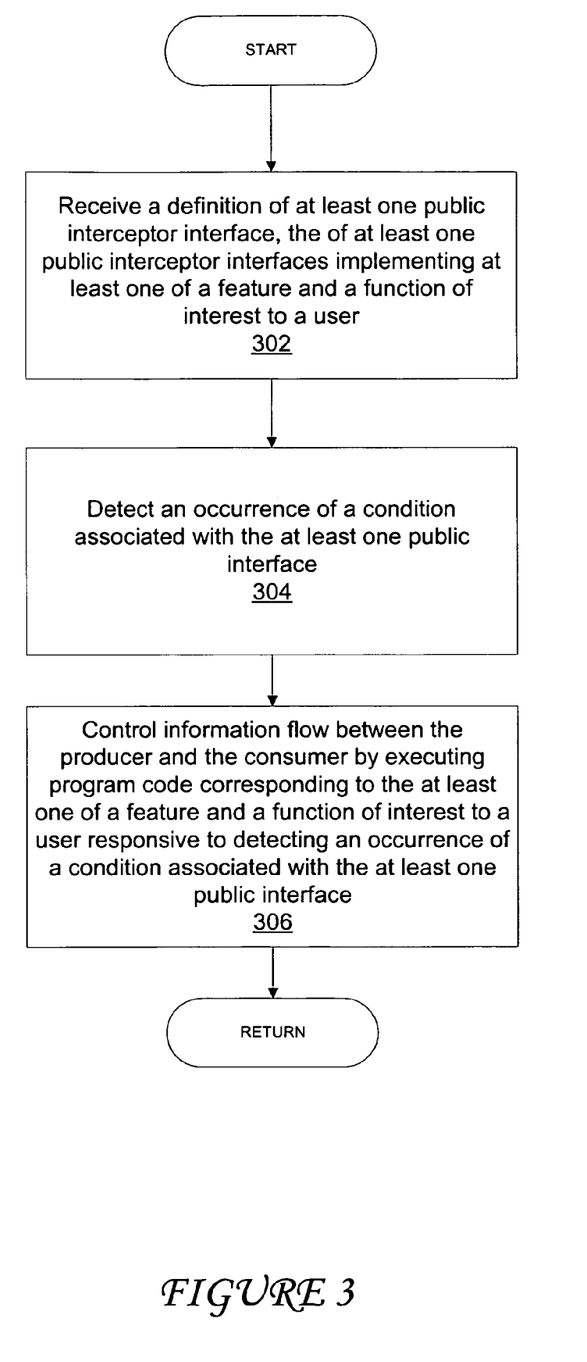
FIG. 3 is an operational flow diagram illustrating a process for providing interceptors between producer(s) and consumer(s) of content in an embodiment.

FIG. 3 is an operational flow diagram illustrating a process for providing interceptors between producer(s) and consumer(s) of content in an embodiment. The technique for providing interceptors between producer(s) and consumer(s) of content shown in FIG. 3 is operable with a remote portal, such as the remote portal environment of FIG. 1 and FIG. 2 for example. As shown in FIG. 3, a definition of at least one public interceptor interface is received. The at least one public interceptor interface implements at least one of a feature or a function of interest to a user (block 302). Then, an occurrence of a condition associated with the at least one public interface is detected (block 304). For example and without limitation, embodiments can detect the occurrence of an operation specified by the Web Services for Remote Portlets (WSRP) standard, such as a getMarkup message, an initCookie request, a performBlockingInteraction message, a handleEvents request or a getRenderDependencies request. Information flow between the producer and the consumer may be controlled by executing program code corresponding to the at least one feature or function of interest to a user responsive to detecting the occurrence of the condition associated with the at least one public interface (block 306). In an embodiment and by way of example, program code implementing the at least one method associated with the at least one public interceptor interface may be executed to perform the at least one of a feature or a function of interest to a user on the information flow between the producer and the consumer. In some embodiments, information may be passed between the consumer and the program code using a context object. Further, in some embodiments, behavior of at least one of the producer and the consumer may be controlled by executing program code corresponding to the at least one of a feature and a function of interest to a user responsive to detecting the occurrence of the condition associated with the at least one public interface.

Interfaces

A plurality of public interceptor interfaces are provided in an example embodiment. These interfaces are related to specific WSRP operations, such as getMarkup and performBlockingInteraction. For further information about these WSRP operations, reference may be had to "Inside WSRP," available at http://dev2dev.bea.com/pub/a/2005/03/inside wsrp.html (last accessed Apr. 27, 2006). For a more general overview, reference may be had to, "Federated Portal Architecture," Chapter 3. Table 1 illustrates a plurality of Interceptor Interfaces exposed to the public in an interceptor embodiment:

TABLE 1

Interceptor Interfaces

| Interface | Description |
| --- | --- |
| IGetMarkupInterceptor | Allows users to intercept and modify a message that is being sent in a getMarkup message or received in a getMarkupResponse. |
| IInitCookieInterceptor | Allows users to intercept the initCookie request. This request is made the first time a consumer displays a proxy portlet for a given user. The request allows the producer to initialize cookies and return them to the consumer. |
| IBlockingInteractionInterceptor | Allows users to intercept and modify a performBlockingInteraction message. |
| IHandleEventsInterceptor | Allows users to intercept a handleEvents request or response. |
| IgetRenderDependenciesInterceptor | Allows users to intercept a getRenderDependencies request or response. Render dependencies include cascading stylesheet (CSS) files and scripts, such as Javascript files, upon which the proper rendering of the portlet depend. |

In an embodiment, each interceptor interface includes the same four methods. Table 2 summarizes these interceptor methods. Table 3 summarizes when each method is called. Possible return values for each method are discussed in Table 4.

TABLE 2

Interceptor Methods

| Method | Description |
| --- | --- |
| preInvoke( ) | This method is called before a message is sent out to a producer. For example, this method is called after a user clicks on a link in a proxy portlet. One use of this method is to intercept a user's input data to verify that it is complete. |
| PostInvoke( ) | This method is called after a producer has processed its request and sent a response back to the consumer. This method can be used to intercept and filter the markup returned by the producer. |
| onFault( ) | This method is called when the producer returns a fault. This method can be used to examine the error and display an informational message or take another appropriate action. |
| onIOFailure( ) | This method is called when the there is an IOException while sending or receiving a message. This method can be used to display an informational message or take another appropriate action. |

TABLE 3

When Interceptor Methods are Called

| Method | When Called |
|---|---|
| preInvoke( ) | Before a WSRP message is sent out to a producer. |
| postInvoke( ) | After a producer has processed its request and sent a response back to the consumer. |
| onFault( ) | This method is called when the producer returns a fault. |
| onIOFailure( ) | This method is called when the consumer receives an IOException while sending or receiving a message. |

It is noteworthy that the preceding tables are a general summary only, and do not include method parameters or return values. Nor do these tables provide an exhaustive list of interfaces available to embodiments and are intended to be illustrative rather than limiting. The specific method signatures depend on the interface in which the method is used.

Interceptor Method Return Values

In an embodiment and by way of example, the following interceptor methods may have return values: preInvoke( ), postInvoke( ), onFault( ), and OnIOFailure( ). These return values will be described in further detail with reference to Table 8 below. Table 4 illustrates possible return values for the preInvoke( ) intercept.

TABLE 4

Return Values for preInvoke( )

| Return Value | Description |
|---|---|
| Status.PreInvoke.CONTINUE_CHAIN | Indicates normal execution. |
| Status.PreInvoke.ABORT_CHAIN | Skips calling preInvoke( ) methods of the subsequent interceptors, but sends the message to the producer. |
| Status.PreInvoke.SKIP_REQUEST_ABORT_CHAIN | Skips calling preInvoke( ) methods of the subsequent interceptors and skips sending the request message to the producer. |

Table 5 illustrates possible return values for the postInvoke( ) intercept.

TABLE 5

Return Values for postInvoke( )

| Return Value | Description |
|---|---|
| Status.PostInvoke.CONTINUE_CHAIN | Indicates normal execution. |
| Status.PostInvoke.ABORT_CHAIN | Skips calling postInvoke( ) methods of the subsequent interceptors. |

Table 6 illustrates possible return values for the onFault( ) intercept.

TABLE 6

Return Values for onFault( )

| Return Value | Description |
|---|---|
| Status.OnFault.CONTINUE_CHAIN | Indicates normal execution. The consumer will handle the fault if rest of the interceptors also return CONTINUE_CHAIN status. |

TABLE 6-continued

Return Values for onFault( )

| Return Value | Description |
|---|---|
| Status.OnFault.ABORT_CHAIN | Skips calling onFault( ) methods of the subsequent interceptors. The consumer will handle the fault. |
| Status.OnFault.RETRY | Resends the message that caused the fault. The onFault( ) methods of the subsequent interceptors are not called. |
| Status.OnFault.HANDLED | Skips calling onFault( ) methods of the subsequent interceptors and assumes that fault has been consumed by the interceptor. The interceptor is responsible for providing all response data. |

Table 7 illustrates possible return values for the OnIOFailure( ) intercept.

TABLE 7

Return Values for OnIOFailure( )

| Return Value | Description |
|---|---|
| Status.OnIOFailure.CONTINUE_CHAIN | Indicates normal execution. The consumer will handle the IO failure if the rest of the interceptors also return CONTINUE_CHAIN status. |
| Status.OnIOFailure.ABORT_CHAIN | Skips calling onIOFailure( ) methods of the subsequent interceptors. The consumer will handle the fault. |
| Status.OnIOFailure.RETRY | Resends the message that caused the IO failure. The onIOFailure( ) methods of the subsequent interceptors are not called. |
| Status.OnIOFailure.HANDLED | Skips calling onIOFailure( ) methods of the subsequent interceptors and assumes that the IO failure is consumed by the interceptor. The interceptor is responsible for providing all response data. |

Context Objects

The interceptor method embodiments receive context objects that can enable getting and setting values in the intercepted SOAP messages. The following describes the flow in which request and response context objects are created and used by interceptors.

Before a message is sent to a producer, or after it is received, the interceptor framework creates an appropriate context object that is passed to the interceptor methods. This object wraps certain elements related to the message. Using methods of the context object, the interceptor can retrieve and set these elements. For example, when a user clicks a link in a remote portlet, the interceptor framework creates a request context object which it then passes to the preInvoke( ) method of the interceptors. After passing through the interceptors and possibly being modified, the request object is used to construct a message that is sent to the producer. Likewise, the interceptor framework constructs a response context object from an incoming message and passes the object to the appropriate interceptor methods.

Figure 4A:
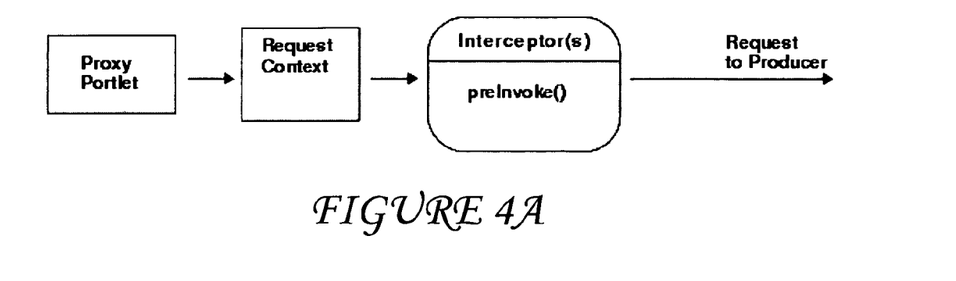
FIGS. 4A-4D are block diagrams illustrating an overview of use of context objects in an embodiment.

As illustrated in FIG. 4A, a request context is passed to the preInvoke( ) methods of registered interceptors. The request context contains information related to the portlet. After processing by one or more interceptors, the interceptor framework creates a message. This message includes any modifications made by the preInvoke( ) method.

Figure 4B:
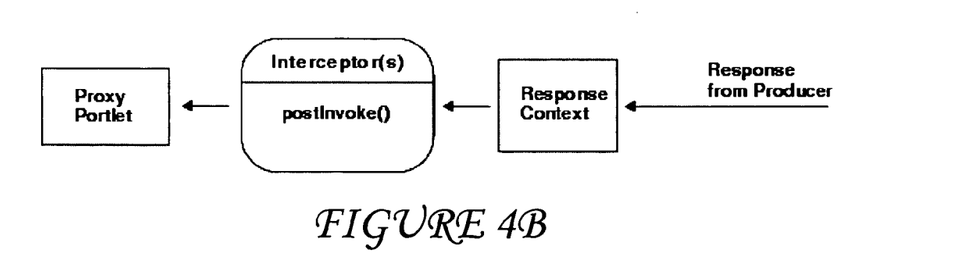

Similarly, as shown in FIG. 4B, the response context object created from an incoming message is passed to the postInvoke( ) method the interceptors that are associated with the producer that generated the response.

Figure 4C:
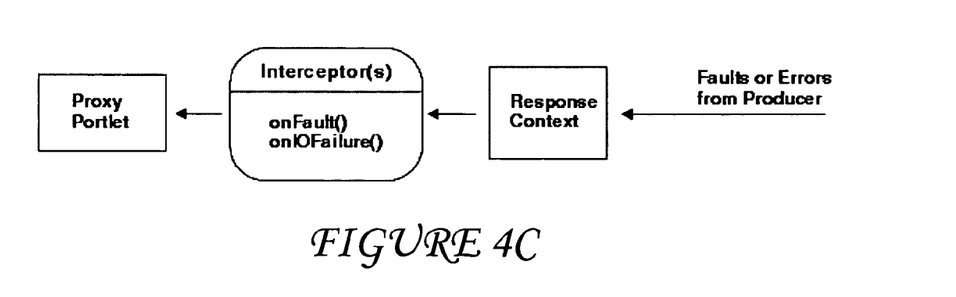

Finally, as shown in FIG. 4C, the response context object created from an incoming error or fault message is passed to either the onFault( ) or onIOFailure( ) method.

Configuring Interceptors

In an embodiment and by way of example, interceptors are configured with a web application scoped configuration file, in wsrp-consumer-handler-config.xml. This configuration file includes entries for: interceptor and chain. Both of these entries are present in the configuration file. The <interceptor> element specifies the fully qualified interceptor classname and provides an arbitrary, unique name. The interceptor class must also be in the web application's class path or another accessible classpath, such as a system-defined classpath. Each interceptor specified by an <interceptor> element must be referenced in a chain.

The <chain> element includes the following elements.

name—A unique name.

producer-handle—(Optional) If the handle is specified for a registered producer, the intereceptor(s) in the chain will only be called on messages receeieved from or sent to that producer. If a producer handle is not specified, then the interceptor(s) in the chain will be called for all producers associated with the consumer.

interceptor-name—The name(s) of the interceptors to include in the chain. Use the name(s) specified in the interceptor element(s).

Figure 4D:
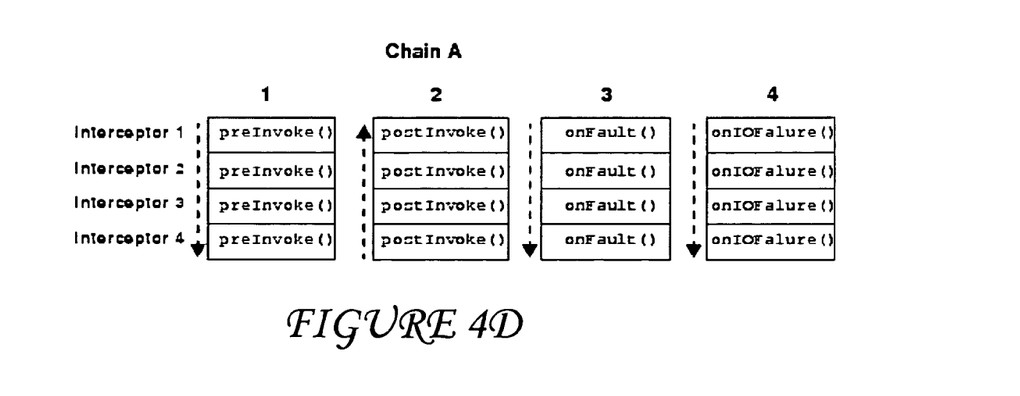

Chains, and the order in which methods in chains are called, will be described in further detail with reference to FIG. 4D below. The following listing demonstrates configuring interceptors for a simple configuration, including two interceptors and one chain.

```
Configuring Interceptors
<interceptor>
    <name>AutoRegisteringInterceptor</name>
    <class-name>myInterceptors.AutoRegistrationInterceptor</class-name>
</interceptor>
<interceptor>
    <name>ErrorMessageCustomizer</name>
    <class-name>myInterceptors.ErrorMessageCustomizer</class-name>
</interceptor>
<interceptor-chain>
    <name>Chain_1</name>
    <producer-handle>MyProducer</producer-handle>
    <interceptor-name>AutoRegistrationInterceptor</interceptor-name>
    <interceptor-name>ErrorMessageCustomizer</interceptor-name>
</interceptor-chain>
```

Order of Method Execution

The following discusses the factors that affect the order of method execution in interceptors and chains of interceptors. An interceptor chain is a collection of interceptors whose methods are called in a well-defined order. A chain can be associated with a specific producer or not associated with any producer. If associated with a single producer, then the interceptors in the chain will be called only when requests and responses occur between the consumer and that specific producer. If no producer is associated with a chain, then the chain's interceptors are called when communication occurs between the consumer and all producers associated with it.

The order in which interceptor methods are called if all methods return a status value of CONTINUE_CHAIN will next be described with reference to an example embodiment. Recall that all interceptors contain four methods: preInvoke( ), postInvoke( ), onFault( ), and onIOFailure( ). In an interceptor chain, all of the preInvoke( ) methods are executed, then the postInvoke( ) methods, the onFault( ) methods, and finally the onIOFailure( ) methods. The following listing demonstrates specification of a default order in which methods in an interceptor chain are called for the following chain definition:

```
Example Interceptor Chain Definition
<interceptor-group>
    <name>Chain-A</name>
    <producer-handle>myProducer</producer-handle>
    <interceptor-name>Interceptor2</interceptor-name>
    <interceptor-name>Interceptor3</interceptor-name>
    <interceptor-name>Interceptor3</interceptor-name>
    <interceptor-name>Interceptor4</interceptor-name>
</interceptor- group>
```

The illustration assumes that all methods return the CONTINUE_CHAIN status. Note that all of the preInvoke( ) methods are called first in the order in which the interceptors appear in the chain configuration, then the postInvoke( ) methods are called in the reverse order. After a postInvoke( ) method is called, the subsequent postInvoke( ) method will be called if the previous one returned with a good return message. The onFault( ) methods are called if a postInvoke( ) method returns a fault, as shown in FIG. 4D. Finally, the onIOFailure( ) methods are called in the event of an I/O failure is detected, as shown in FIG. 4D. It is noteworthy that it is possible to define interceptors in the configuration file that are associated with specific producers or unassociated with any specific producer. An unassociated interceptor does not have a <producer-handle> element defined with it. Unassociated interceptors are always called first for all producer transactions, before the interceptors that are associated with a specific producer are called. Unassociated interceptors are called in the order in which they appear in the configuration file.

The return status of interceptor methods also affects the order in which interceptor methods are executed. It's helpful to think of chains of interceptor methods. It's easier to understand the way interceptor chains work by conceptualizing four separate chains: a preInvoke( ) chain, a postInvoke( ) chain, an onFault( ) chain, and an onIOFailure( ) chain. If chains are conceptualized in this way, it's easier to understand the effect of return status on the execution of the chain. Table 8 summarizes the possible return values for interceptor methods and how they affect the order of execution in a chain. The first two return values illustrated by Table 8, CONTINUE_CHAIN and ABORT_CHAIN apply to all chains. The third return value, SKIP_REQUEST_ABORT_CHAIN applies only to preInvoke( ) chains. The fourth and fifth return values, HANDLED and RETRY apply only to onFault( ) and onIOFailure( ) chains.

TABLE 8

Interceptor Method Return Values

| Return Value | Description |
|---|---|
| CONTINUE_CHAIN | If all methods return a CONTINUE_CHAIN status, interceptors in a chain are executed in order. |
| ABORT_CHAIN | Skips calling methods of the subsequent interceptors in the chain, but sends the message on to the producer. A use case for ABORT_CHAIN is trapping a registration error. If the interceptor is able to fix the error, it can then be re-submitted to the producer. |
| SKIP_REQUEST_ABORT_CHAIN | Skips calling methods of the subsequent interceptors in the chain and skips sending the request message to the producer. A use case for SKIP_REQUEST_ABORT_CHAIN interceptor performs caching. If markup exists in the cache, there may be no reason to perform further processing and return a message to the producer. |
| HANDLED | Skips calling the fault-handling methods of the subsequent interceptors in the chain and assumes that fault has been consumed by the interceptor. The interceptor is responsible for providing markup data input stream, in the absence of it will result in rendering "no markup found error" error message in the portlet. |
| RETRY | Resends the message that caused the fault. The fault-handling methods of the subsequent interceptors in the chain are not called. Only one retry is permitted per message. |

A new instance of an interceptor implementation class is created for every message before calling preInvoke( ). This same instance is reused to call postInvoke( ), onFault( ), and onIOFailure( ). This allows users to set and use instance variables within the scope of a request. For a given instance, all methods are called once; however, preInvoke( ) and postInvoke( ) can be called one more time if the RETRY status is returned by either onFault( ) or onIOFailure( ). Only one retry is permitted per message by one embodiment.

Example Chains

Figure 5A:
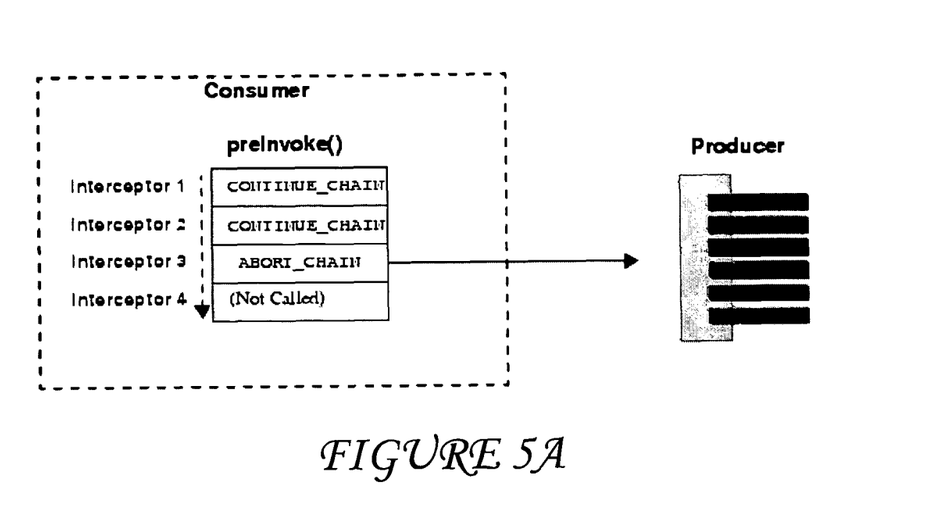
FIGS. 5A-5D are block diagrams illustrating interceptor examples in various embodiments.

By way of example and without limitation, a flow of method execution in an interceptor chain will next be described with reference to an embodiment. FIG. 5A illustrates the flow in an interceptor chain when the preInvoke( ) method is called on the chain. When a status of ABORT_CHAIN returned, a message is immediately returned to the producer. The preInvoke( ) methods of subsequent interceptors in the chain are not called.

Figure 5B:
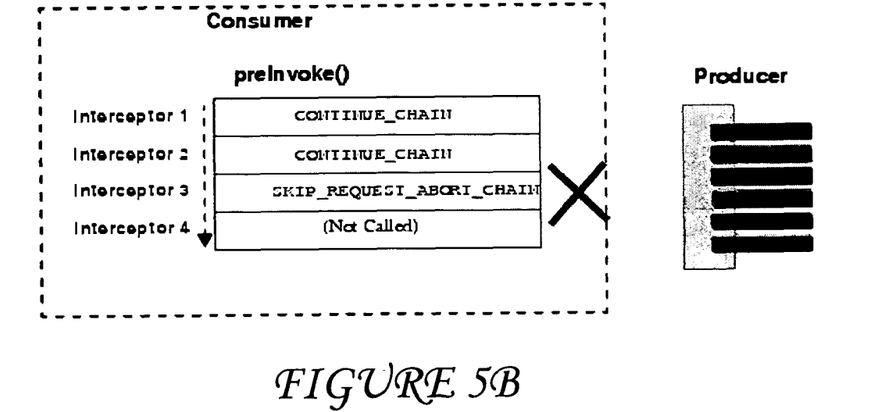

FIG. 5B illustrates another example of the flow in an interceptor chain when the preInvoke( ) method is called on the chain. When a status of SKIP_REQUEST_ABORT_CHAIN is returned, no message is sent to the producer. The preInvoke( ) methods of subsequent interceptors in the chain are not called.

Figure 5C:
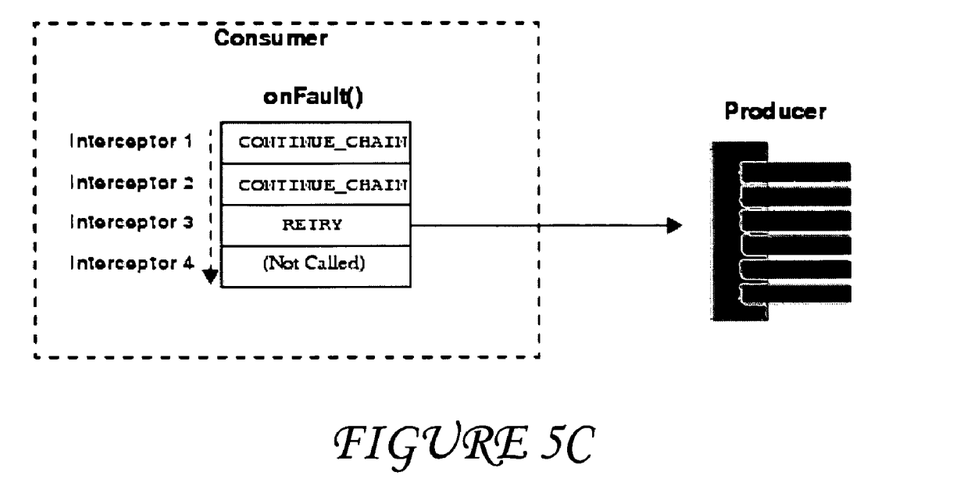

FIG. 5C illustrates the flow in an interceptor chain when the onFault( ) method is called on the chain. When a status of RETRY is returned, the same message that caused the failure, with possible modifications inserted by the interceptor, is returned to the producer. The onFault( ) methods of subsequent interceptors in the chain are not called. Only one retry is permitted in an embodiment. If the same fault is returned, the interceptor framework assumes that the error is handled by the interceptor, and a status of HANDLED is returned.

Figure 5D:
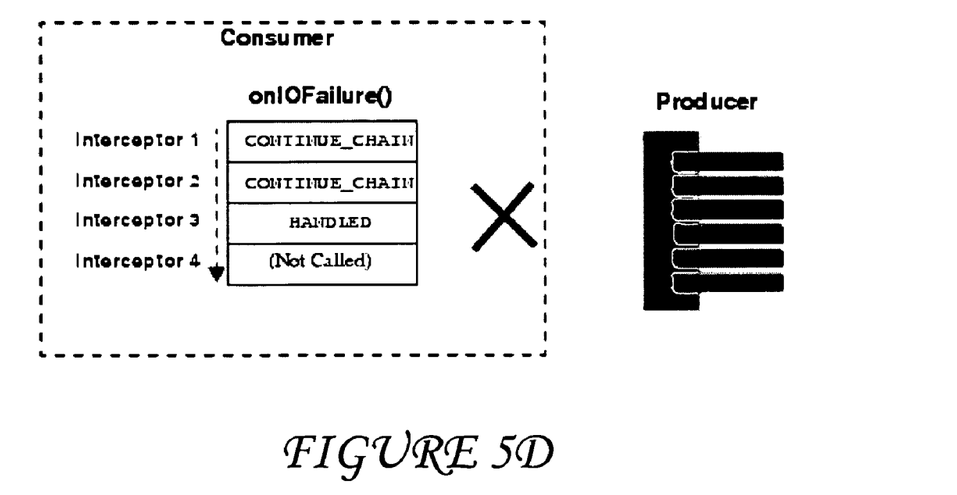

FIG. 5D illustrates the flow in an interceptor chain when the onIOFailure( ) method is called on the chain. In this case, the no message is returned to the producer, and the framework assumes that fault has been consumed by the interceptor. The onIOFailure( ) methods of subsequent interceptors in the chain are not called. Only one retry is permitted. If the same fault is returned, the interceptor framework assumes that the error is handled by the interceptor, and a status of HANDLED is returned.

The following illustrates two simple interceptor implementations. The first implements the onFault( ) method and modifies the error message that is returned to the producer. The second implements onFault( ) and redirects portlet to display an error page.

Embodiments can enable the use of interceptors to retrieve and modify exceptions thrown from the producer. In ErrorMessageCustomizer, the onFault( ) method retrieves a Throwable from the response. Users can design an onFault( ) method to examine the exception and take any appropriate action. In this case, the error message is retrieved, modified, and written back to the IGetMarkupResponseContext object. The return status HANDLED has the following effects: (1) If the interceptor is part of a chain, skips calling subsequent onFault( ) methods in the chain; and (2) Returns markup data to the producer. This markup is then displayed in the portlet. If markup data is not returned to the producer, the portlet displays the message "No Markup Found Error."

```
ErrorMessageCustomizer
import com.bea.wsrp.consumer.interceptor.IGetMarkupInterceptor;
import com.bea.wsrp.model.markup.IGetMarkupRequestContext;
import com.bea.wsrp.model.markup.IGetMarkupResponseContext;
import com.bea.wsrp.consumer.interceptor.Status;
import weblogic.xml.util.StringInputStream;
public class ErrorMessageCustomizer implements IGetMarkupInterceptor
{
    public Status.PreInvoke preInvoke(IGetMarkupRequestContext
            requestContext)
    {
        return Status.PreInvoke.CONTINUE_CHAIN;
    }
    public Status.PostInvoke postInvoke(IGetMarkupRequestContext
            requestContext, IGetMarkupResponseContext responseContext)
    {
        return Status.PostInvoke.CONTINUE_CHAIN;
    }
    public Status.OnFault onFault(IGetMarkupRequestContext
    requestContext,
                    IGetMarkupResponseContext responseContext,
                    Throwable t)
    {
        String message = "This Message is Customized by
ErrorMessageCustomizer\n";
        message = message + t.getMessage( );
        StringInputStream stringInputStream = new
StringInputStream(message);
        responseContext.setMarkupData(stringInputStream);
        return Status.OnFault.HANDLED;
    }
```

-continued

```
    public Status.OnIOFailure onIOFailure(IGetMarkupRequestContext
        requestContext,IGetMarkupResponseContext responseContext,
        Throwable t)
    {
        return Status.OnIOFailure.CONTINUE_CHAIN;
    }
}
```

In the next example, the onFault( ) method is implemented to include an error JSP page in the portlet:

```
DisplayErrorPage Class
import com.bea.wsrp.consumer.interceptor.IGetMarkupInterceptor;
import com.bea.wsrp.model.markup.IGetMarkupRequestContext;
import com.bea.wsrp.model.markup.IGetMarkupResponseContext;
import com.bea.wsrp.consumer.interceptor.Status;
import weblogic.xml.util.StringInputStream;
public class DisplayErrorPage implements IGetMarkupInterceptor
{
    public Status.PreInvoke preInvoke(IGetMarkupRequestContext
requestContext)
    {
        return Status.PreInvoke.CONTINUE_CHAIN;
    }
    public Status.PostInvoke postInvoke(IGetMarkupRequestContext
            requestContext, IGetMarkupResponseContext
responseContext)
    {
        return Status.PostInvoke.CONTINUE_CHAIN;
    }
    public Status.OnFault onFault(IGetMarkupRequestContext
                    requestContext, IGetMarkupResponseContext
                    responseContext, Throwable t)
    {
      try
      {
            if (t instanceof MyError) {
responseContext.render(requestContext.getHttpServletRequest( ),
                        requestContext.getHttpServletResponse( ),
                        "/redirectTarget/myTarget.jsp");
            } else {
responseContext.render(requestContext.getHttpServletRequest( ),
                        requestContext.getHttpServletResponse( ),
                        "/redirectTarget/defaultTarget.jsp");
            }
        }
        catch (ServletException e)
        {
            e.printStackTrace( );
        }
        catch (IoException e)
        {
            e.printStackTrace( );
        }
        return Status.OnFault.HANDLED;
    }
    public Status.OnIOFailure onIOFailure(IGetMarkupRequestContext
                requestContext, IGetMarkupResponseContext
                responseContext, Throwable t)
    {
        return Status.OnIOFailure.CONTINUE_CHAIN;
    }
}
```

Use Cases

Embodiments can enable the use of the Interceptor Framework for many different purposes. Some of the most common use cases for interceptors will next be described:

Handling Errors—Embodiments can enable the use of interceptors to handle errors returned from a producer. For instance, if a specific producer is not registered, users can trap the registration error and handle it as users wish. Users may display an informative message to the user, or may choose to automatically register the producer. An interceptor can also catch an I/O exception, which can occur if the producer is unavailable. In this case, users might choose to handle the error by displaying an informative message for the user or prevent future requests to the producer.

Caching Markup—Embodiments can enable the use of interceptors to cache markup returned from a producer. This feature enables the user to use any external caching system desired. In addition, by caching markup on the consumer, users can, in some circumstances, reduce round-trip communication between the consumer and producer.

Validating Data—Embodiments can enable the use of interceptors to filter user submitted data. If the user's data is determined to be invalid, an informational message may be displayed, or the data can be prevented from being sent to the producer.

Replacing Markup—An interceptor can filter, replace or modify markup data sent from the producer. An interceptor can also modify the navigational state of a remote portlet.

Modifying HTTP Headers—Interceptors can add or remove some HTTP headers, and can also inspect response headers.

In other aspects, the invention encompasses in some embodiments, computer apparatus, computing systems and machine-readable media configured to carry out the foregoing methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to program a computer to perform any of the processes of the present invention. The storage medium can include, but is not limited to, any type of rotating media including floppy disks, optical discs, DVD, CD-ROMs, microdrive, and magneto-optical disks, and magnetic or optical cards, nanosystems (including molecular memory ICs), or any type of media or device suitable for storing instructions and/or data.

Stored on any one of the machine readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications.

Included in the programming (software) of the general/specialized computer or microprocessor are software modules for implementing the teachings of the present invention, including, but not limited to providing mechanisms and methods for providing interceptors between producer(s) and consumer(s) of content as discussed herein.

Figure 6:
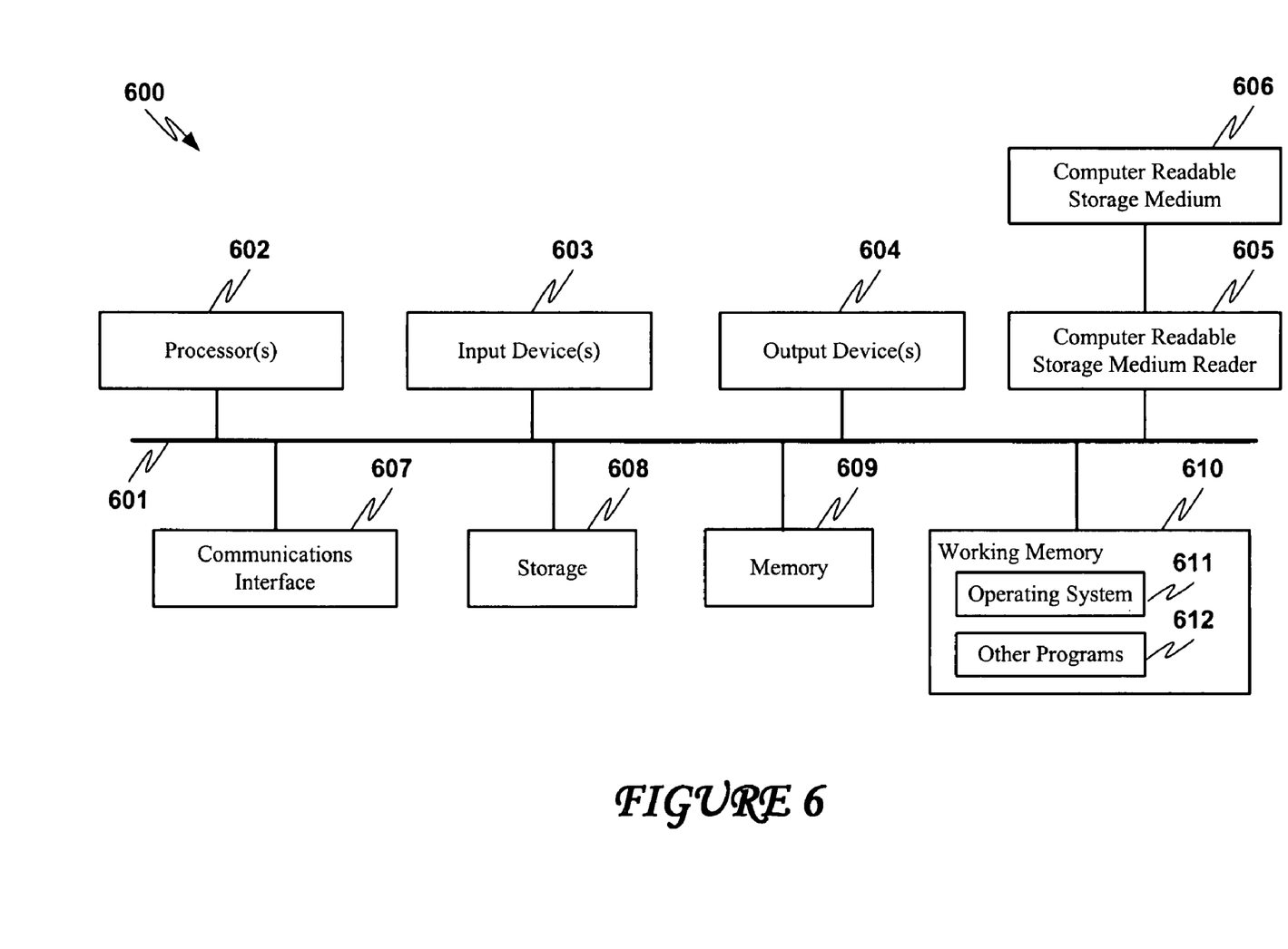
FIG. 6 is a hardware block diagram of an example computer system, which may be used to embody one or more components in an embodiment.

FIG. 6 illustrates an exemplary processing system 600, which can comprise one or more of the elements of FIG. 1. Turning now to FIG. 6, an exemplary computing system is illustrated that may comprise one or more of the components of FIG. 1. While other alternatives might be utilized, it will be presumed for clarity sake that components of the systems of FIG. 1 are implemented in hardware, software or some combination by one or more computing systems consistent therewith, unless otherwise indicated.

Computing system 600 comprises components coupled via one or more communication channels (e.g., bus 601) including one or more general or special purpose processors 602, such as a Pentium®, Centrino®, Power PC®, digital signal processor ("DSP"), and so on. System 600 components also include one or more input devices 603 (such as a mouse, keyboard, microphone, pen, and so on), and one or more output devices 604, such as a suitable display, speakers, actuators, and so on, in accordance with a particular application. (It will be appreciated that input or output devices can also similarly include more specialized devices or hardware/software device enhancements suitable for use by the mentally or physically challenged.)

System 600 also includes a machine readable storage media reader 605 coupled to a machine readable storage medium 606, such as a storage/memory device or hard or removable storage/memory media; such devices or media are further indicated separately as storage 608 and memory 609, which may include hard disk variants, floppy/compact disk variants, digital versatile disk ("DVD") variants, smart cards, read only memory, random access memory, cache memory, and so on, in accordance with the requirements of a particular application. One or more suitable communication interfaces 607 may also be included, such as a modem, DSL, infrared, RF or other suitable transceiver, and so on for providing inter-device communication directly or via one or more suitable private or public networks or other components that may include but are not limited to those already discussed.

Working memory 610 further includes operating system ("OS") 611 elements and other programs 612, such as one or more of application programs, mobile code, data, and so on for implementing system 600 components that might be stored or loaded therein during use. The particular OS or OSs may vary in accordance with a particular device, features or other aspects in accordance with a particular application (e.g. Windows®, WindowsCE™, Mac™, Linux, Unix or Palm™ OS variants, a cell phone OS, a proprietary OS, Symbian™, and so on). Various programming languages or other tools can also be utilized, such as those compatible with C variants (e.g., C++, C#), the Java™ 2 Platform, Enterprise Edition ("J2EE") or other programming languages in accordance with the requirements of a particular application. Other programs 612 may further, for example, include one or more of activity systems, education managers, education integrators, or interface, security, other synchronization, other browser or groupware code, and so on, including but not limited to those discussed elsewhere herein.

When implemented in software (e.g. as an application program, object, agent, downloadable, servlet, and so on in whole or part), a learning integration system or other component may be communicated transitionally or more persistently from local or remote storage to memory (SRAM, cache memory, etc.) for execution, or another suitable mechanism can be utilized, and components may be implemented in compiled or interpretive form. Input, intermediate or resulting data or functional elements may further reside more transitionally or more persistently in a storage media, cache or other volatile or non-volatile memory, (e.g., storage device 608 or memory 609) in accordance with a particular application.

Other features, aspects and objects of the invention can be obtained from a review of the figures and the claims. It is to be understood that other embodiments of the invention can be developed and fall within the spirit and scope of the invention and claims. The foregoing description of preferred embodiments of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed:

1. A method for providing an interceptor between a producer and a consumer in a remote portal system, the method comprising:

providing a computer, including a computer readable storage medium and processor operating thereon, and the consumer executing on the computer, wherein the consumer includes an interceptor framework;

receiving, at the consumer, definitions of a plurality of public interceptor interfaces, wherein the plurality of public interceptor interfaces each implement at least one of a feature and a function, and wherein each public interceptor interface is associated with a web application available through the consumer;

detecting an occurrence of a condition associated with at least one public interceptor interface;

creating, by the interceptor framework, a context object associated with the occurrence and passing the context object to the at least one public interceptor interface;

processing the context object by the at least one public interceptor interface to create a modified context object and passing the modified context object to the interceptor framework;

constructing a message, by the interceptor framework, based on the modified context object;

sending the message to one or more of the consumer and the producer based on the occurrence; and in response to detecting the occurrence of the condition associated with the at least one public interceptor interface, executing program code corresponding to the at least one of a feature and a function to control behavior of at least one of the producer and the consumer.

2. The method of claim 1, wherein receiving a definition of at least one public interceptor interface, the at least one public interceptor interface implementing at least one of a feature and a function includes:

receiving a definition of at least one method associated with the at least one public interceptor interface, the at least one method implementing the at least one of a feature and a function.

3. The method of claim 1, wherein detecting an occurrence of a condition associated with the at least one public interface includes:

detecting an occurrence of an operation specified by the Web Services for Remote Portlets (WSRP) standard.

4. The method of claim 3, wherein detecting the occurrence of an operation specified by the Web Services for Remote Portlets (WSRP) standard includes:

detecting the occurrence of at least one of a getMarkup message, an initCookie request, a performBlocking-Interaction message, a handleEvents request and a getRenderDependencies request.

5. The method of claim 1, wherein controlling information flow between the producer and the consumer by executing program code corresponding to the at least one of a feature and a function responsive to detecting the occurrence of the condition associated with the at least one public interface includes:

executing program code implementing at least one method associated with the at least one public interceptor interface, the at least one method performing the at least one of a feature and a function on the information flow between the producer and the consumer.

6. The method of claim 5, further comprising:

passing information between the consumer and the program code using a context object.

7. The method of claim 5, wherein executing program code implementing at least one method associated with the at least one public interceptor interface, the at least one method performing the at least one of a feature and a function on the information flow between the producer and the consumer includes:

parsing data within at least one message exchanged between the consumer and the producer into a format.

8. The method of claim 7 wherein, parsing data within at least one message exchanged between the consumer and the producer into a format includes:

parsing data from Simple Object Access Protocol (SOAP) objects into Java Beans.

9. A computer readable storage medium carrying one or more sequences of instructions for providing an interceptor between a producer and a consumer in a remote portal system, which instructions, when executed by one or more processors, cause the one or more processors to carry out the steps of:

receiving, at the consumer that includes an interceptor framework, definitions of a plurality of public interceptor interfaces, wherein the plurality of public interceptor interfaces each implement at least one of a feature and a function, and wherein each public interceptor interface is associated with a web application available through the consumer;

detecting an occurrence of a condition associated with the at least one public interceptor interface;

creating, by the interceptor framework, a context object associated with the occurrence and passing the context object to the at least one public interceptor interface;

processing the context object by the at least one public interceptor interface to create a modified context object and passing the modified context object to the interceptor framework;

constructing a message, by the interceptor framework, based on the modified context object;

sending the message to one or more of the consumer and the producer based on the occurrence; and in response to detecting the occurrence of the condition associated with the at least one public interceptor interface, executing program code corresponding to the at least one of a feature and a function to control behavior of at least one of the producer and the consumer.

10. The computer readable storage medium as recited in claim 9, wherein the instructions for carrying out the step of receiving a definition of at least one public interceptor interface, the at least one public interceptor interface implementing at least one of a feature and a function include instructions for carrying out the step of:

receiving a definition of at least one method associated with the at least one public interceptor interface, the at least one method implementing the at least one of a feature and a function.

11. The computer readable storage medium as recited in claim 9, wherein the instructions for carrying out the step of detecting an occurrence of a condition associated with the at least one public interface include instructions for carrying out the step of:

detecting the occurrence of an operation specified by the Web Services for Remote Portlets (WSRP) standard.

12. The computer readable storage medium as recited in claim 11, wherein the instructions for carrying out the step of detecting the occurrence of an operation specified by the Web Services for Remote Portlets (WSRP) standard include instructions for carrying out the step of:

detecting the occurrence of at least one of a getMarkup message, an initCookie request, a performBlocking-Interaction message, a handleEvents request and a getRenderDependencies request.

13. The computer readable storage medium as recited in claim 9, wherein the instructions for carrying out the step of controlling information flow between the producer and the consumer by executing program code corresponding to the at least one of a feature and a function responsive to detecting the occurrence of the condition associated with the at least one public interface include instructions for carrying out the step of:

executing program code implementing at least one method associated with the at least one public interceptor interface, the at least one method performing the at least one of a feature and a function on the information flow between the producer and the consumer.

14. The computer readable storage medium as recited in claim 13, further comprising instructions for carrying out the step of:

passing information between the consumer and the program code using a context object.

15. The computer readable storage medium as recited in claim 13, wherein the instructions for carrying out the step of executing program code implementing at least one method associated with the at least one public interceptor interface, the at least one method performing the at least one of a feature and a function on the information flow between the producer and the consumer include instructions for carrying out the step of:

parsing data within at least one message exchanged between the consumer and the producer into a format.

16. The computer readable storage medium as recited in claim 15, wherein the instructions for carrying out the step of parsing data within at least one message exchanged between the consumer and the producer into a format include instructions for carrying out the step of:

parsing data from Simple Object Access Protocol (SOAP) objects into Java Beans.

17. An apparatus for providing an interceptor between a producer and a consumer in a remote portal system, the apparatus comprising:

a processor; and a memory including one or more stored sequences of instructions which, when executed by the processor, cause the processor to carry out the steps of:

receiving, at the consumer that includes an interceptor framework, definitions of a plurality of public interceptor interfaces, wherein the plurality of public interceptor interfaces each implement at least one of a feature and a function, and wherein each public interceptor interface is associated with a web application available through the consumer;

detecting an occurrence of a condition associated with the at least one public interface;

creating, by the interceptor framework, a context object associated with the occurrence and passing the context object to the at least one public interceptor interface;

processing the context object by the at least one public interceptor interface to create a modified context object and passing the modified context object to the interceptor framework;

constructing a message, by the interceptor framework, based on the modified context object;

sending the message to one or more of the consumer and the producer based on the occurrence; and in response to detecting the occurrence of the condition associated with the at least one public interceptor interface, executing program code corresponding to the at least one of a feature and a function to control behavior of at least one of the producer and the consumer.

* * * * *